US008892725B2

(12) United States Patent
Wang et al.

(10) Patent No.: US 8,892,725 B2
(45) Date of Patent: Nov. 18, 2014

(54) METHOD FOR NETWORK ANOMALY DETECTION IN A NETWORK ARCHITECTURE BASED ON LOCATOR/IDENTIFIER SPLIT

(75) Inventors: Sheng Wang, Chengdu (CN); Jing Ren, Chengdu (CN); Du Xu, Chengdu (CN); Shizhong Xu, Chengdu (CN)

(73) Assignee: University of Electronic Scienece and Technology of China, Chengdu (CN)

( * ) Notice: Subject to any disclaimer, the term of this patent is extended or adjusted under 35 U.S.C. 154(b) by 962 days.

(21) Appl. No.: 12/917,999

(22) Filed: Nov. 2, 2010

(65) Prior Publication Data

US 2011/0196961 A1 Aug. 11, 2011

(30) Foreign Application Priority Data

Feb. 8, 2010 (CN) .......................... 2010 1 9087016

(51) Int. Cl.
*G06F 15/173* (2006.01)
*H04L 29/06* (2006.01)
(52) U.S. Cl.
CPC .................................. *H04L 63/1458* (2013.01)
USPC .......................................... 709/224; 709/223
(58) Field of Classification Search
USPC .................................................. 709/224, 223
See application file for complete search history.

(56) References Cited

U.S. PATENT DOCUMENTS

| 2004/0260947 | A1* | 12/2004 | Brady et al. | 713/201 |
| 2005/0238046 | A1* | 10/2005 | Hassan et al. | 370/465 |
| 2008/0250497 | A1* | 10/2008 | Mullarkey et al. | 726/22 |
| 2012/0131142 | A1* | 5/2012 | Flinck | 709/217 |

OTHER PUBLICATIONS

Blumenthal, M.S. And Clark, D.D., "Rethinking the Design of the Internet: The End-to-End Arguments vs. the Brave New World," ACM Transactions on Internet Technology, vol. 1, No. 1, Aug. 2001, p. 70-109.
Chandola, V. et al., "Anomaly Detection: A Survey," ACM Computing Surveys, Sep. 2009, p. 1-72.
Denning, D. E., "An Intrusion-Detection Model," IEEE Transactions on Software Engineering, vol. SE-13, No. 2, Feb. 1987, p. 222-232.

(Continued)

*Primary Examiner* — Dustin Nguyen
*Assistant Examiner* — Joel Mesa
(74) *Attorney, Agent, or Firm* — Hamre, Schumann, Mueller & Larson, P.C.

(57) ABSTRACT

The present invention relates to a method for detecting Network Anomaly in network architectures based on locator/identifier split, the detection flow is as follows: initialization processing, and in ITR: processing data packets, sending a Map-Request, determining whether to send an additional Map-Request, sending the data packet, processing the Map_Reply, processing EID-to-RLOC Cache entry expired; in ETR: processing data packet, processing Map-Request, determining whether the traffic of the ITR currently sending the Map-Request is abnormal, replying to the ITR of which the query traffic is abnormal, replying to ITR of which the query traffic is abnormal. With respect to the characteristic that the network architecture based on locator/identifier split needs to query the relationship between the locator and the identifier for packet delivery, the present invention detects Network Anomaly based on query traffic instead of network data packet traffic. Thus the present invention has the advantages of effectively reducing the investment on detection device, The overhead of exchanging monitoring information and the detection system maintenance cost; facilitating cross domain coordination; and efficiently handling the failures occurring during network operation in time; effectively improve the reliability of the network, being suitable for a large-scale network.

10 Claims, 3 Drawing Sheets

(56) References Cited

OTHER PUBLICATIONS

Farinacci, D. et al., "Locator/ID Separation Protocol (LISP)," Internet Draft submitted to the Internet Engineering Task Force on Oct. 11, 2010, located at https://datatracker.ietf.org/doc/draft-ietf-lisp/, 81 pages.

Huang, L. et al., "Distributed PCA and Network Anomaly Detection," Technical Report No. UCB/EECS-2006-99, Electrical Engineering and Computer Sciences, University of California at Berkeley, Jul. 14, 2006, 15 pages.

Lakhina, A. et al., "Diagnosing Network-Wide Traffic Anomalies," SIGCOMM '04, 2004, 12 pages.

Meyer, D. et al., "Report from the IAB Workshop on Routing and Addressing," located at https://datatracker.ietf.org/doc/rfc4984/, Sep. 2007, 39 pages.

Saltzer, J., "On the Naming and Binding of Network Destinations," located at https://datatracker.ietf.org/doc/rfc1498/, Aug. 1993, 10 pages.

* cited by examiner

METHOD FOR NETWORK ANOMALY DETECTION IN A NETWORK ARCHITECTURE BASED ON LOCATOR/IDENTIFIER SPLIT

FIELD OF THE INVENTION

The present invention relates to a network security technology in a network architecture based on locator/identifier split, and particularly, to a method for detecting and processing anomaly in the network architecture based on locator/identifier split by using the characteristic that the network needs to obtain the mapping relationship between the locator and the identifier for packet delivery.

DESCRIPTION OF THE RELATED ART

The current Internet is established by assuming that all network nodes are under the circumstance of mutual trust, and the network only provides best effort datagram delivery, thus the controllability and manageability of the network are poor. Meanwhile, the network can be accessed arbitrarily and the host has the ability of writing source and destination addresses in the packet, thus the attacker can easily avoid being traced by Source Address Spoofing. In the Internet, the Internet Protocol (IP) address has semantic overload, i.e., the IP address denotes endpoint identifier used in transport layer and routing locator of the host simultaneously, thus mobility, network multi-homing, traffic engineering, etc. cannot be supported effectively. But if the above functions are realized, it may result in an uncontrolled DFZ RIB growth.

The network architecture based on locator/identifier split is a next generation of Internet solution provided with respect to the defects of the conventional Internet, such as semantic overload of IP address, poor controllability and manageability of the network. The basic principle is to separate the endpoint identifier from its routing locator into two different numbering spaces. Related concepts are described in reference to an example that illustrates a schematic view of the structure of a LISP (Locator/ID separation Protocol) network architecture based on locator/identifier split as shown in FIG. 2.

Endpoint identity (EID): An EID is allocated to a host from an EID-prefix block associated with the site where the host is located. In addition, an EID block assigned to a site may have site-local structure (subnetting) for routing within the site; this structure is not visible to the global routing system EID-prefix: A power-of-2 block of EIDs which are allocated to a site by an address allocation authority. EID-prefixes are associated with a set of RLOC addresses which make up a "database mapping".

Routing Locator (RLOC): the address of the Tunnel Router (TR) in the core network. It is the output of a EID-to-RLOC mapping lookup. An EID maps to one or more RLOCs. Typically, RLOCs are numbered from topologically-aggregatable blocks that are assigned to a site at each point to which it attaches to the global Internet; where the topology is defined by the connectivity of provider networks. Multiple RLOCs can be assigned to the same ETR device or to multiple ETR devices at a site.

Tunnel Router (TR): refers to the router that is the tunnel endpoint. For example, "An TR can be located at the router", meaning both ITR and ETR functionality is at the router Ingress Tunnel Router (ITR): a router which accepts an IP packet with a single IP header (more precisely, an IP packet that does not contain a LISP header). The router treats this "inner" IP destination address as an EID and performs an EID-to-RLOC mapping lookup. The router then prepends an "outer" IP header with one of its globally-routable RLOCs in the source address field and the result of the mapping lookup in the destination address field.

Egress Tunnel Router (ETR): a router that accepts an IP packet where destination address in the "outer" IP header is one of its own RLOCs. The router strips the "outer" header and forwards the packet based on the next IP header found. In general, an ETR receives LISP-encapsulated IP packets from the Internet on one side and sends decapsulated IP packets to end host on the other side.

Mapping system: in LISP, The TR maps the destination EID to a RLOC that corresponds to an entry point in the destination domain, hence an EID-to-RLOC mapping system is needed. An ITR may query the mapping system by sending a Map-Request message into the mapping system to request a particular EID-to-RLOC mapping, and the authoritative ETR responds with a Map-Reply message EID-to-RLOC Cache: a short-lived, on-demand database in an ITR that stores, tracks, and is responsible for timing-out and otherwise validating EID-to-RLOC mappings. This cache is distinct from the "database", the cache is dynamic, local, and relatively small while and the database is distributed, relatively static, and much global in scope. After receiving the first data packets to an EID-prefix, ITR sends a Map-request into the mapping system and creates an entry for this EID-prefix, then set a timer for this cache entry. When ITR receive the Map-Reply, it refreshes the entry.

EID-to-RLOC Database: a globally, distributed database that contains all known EID-prefix to RLOC mappings. Each potential ETR typically contains a small piece of the database: the EID-to-RLOC mappings for the EID prefixes "behind" the router. These map to one of the router's own, globally-visible, IP addresses Data plane: its operation is as follows, when a host in a LISP-capable domain emits a packet, it puts its EID in the packet source address, and EID of the correspondent host in its destination address. If the destination of the packet is in another domain, the packet traverses the source domain infrastructure to one of its ITRs. The ITR maps destination EID to a RLOC that corresponds to an ETR that is in the destination domain (how this mapping is accomplished in LISP mapping system is discussed above). The ITR then encapsulates the packet, setting the destination address to the RLOC of the ETR returned by the mapping system.

The basic composition (structure) of the LISP network is described as the above. Although the network architecture based on locator/identifier split separates the "identifier" denoting host identity information from the "locator" denoting routing information to effectively support mobility and reduce routing table entries, and makes the attacker cannot spoof the source address and cannot avoid being traced, the network architecture based on locator/identifier split still cannot prevent Distributed Denial of services (DDoS), wherein the DDoS recruits multiple hosts (zombies) to send a large number of false datum or requests to the victim that is greater than its capabilities. Therefore, such security problems still need to be detected and processed in real time.

Network anomaly detection tracks critical network characteristics in real time and generates an alarm if a strange event or trend is detected that could indicate the presence of a threat. The major characteristics used by network anomaly detection include traffic, and some application layer measurements. Application layer measurements need to be collected by analyzing packets content. So identifying anomalies requires a sophisticated monitoring infrastructure. However traffic is a simple traffic measures which is easy to collect (using SNMP), and it can indicate many types of malicious events. So traffic anomaly detection has drawn significant attention. In addition, due to the characteristics of DDoS, it causes a single anomaly detection device, which cannot acquire the condition of the entire network, unable to detect such kind of distributed attacking effectively, therefore a distributed Anomaly Detection system needs to be adopted. However, constructing a distributed Anomaly Detection system further requires employing a lot of detection devices. Taking a statistical-based detection system commonly used in such detection as an example (FIG. 3 is a schematic diagram of the operation of the detection system in the network architecture based on locator/identifier split), each monitor continuously measures the volume of traffic on local link and periodically push all latest measurements to the data coordinator. Then the data coordinator analyzes the information from all the monitors as a whole to determine whether the traffic is anomaly. Since the performance of distributed detection system depends on the number and locations of the detection devices, a large amount of detection devices need to be set so as to achieve good detection effect. However, as these devices per se are not part of the network basic infrastructure, and these detection devices need to exchange information with each other, there are defects such as the overheads of exchanging monitoring information is large, the maintenance cost of the detection system is high, the cross domain coordination is difficult, the reliability is poor, etc. Therefore, such method is only adopted in subnet, and is difficult to perform real-time detection and processing in the large scale networks.

SUMMARY OF THE INVENTION

The object of the present invention is to provide, with respect to the defects of the prior art, a method for detecting Network Anomaly in network architecture based on locator/identifier split, so as to effectively reduce the investment on detection devices, the overhead of exchanging monitoring information and the maintenance cost of the detection system; improve the reliability and facilitate cross domain coordination; and efficiently handle the failures occurring during network operation in time; which is favorable to be popularized and applied in a large extent.

The solution of the present invention is to detect anomaly through the traffic of query message instead of data packet. By utilizing the process of querying the mapping relationship in the network based on locator/identifier split, the ITR collects local traffic information, and flexibly adjusts the timing of sending a Map-Request; based on the traffic of received Map-Request, the ETR evaluates the traffic of actual data packet, so as to effectively detect the anomaly of the actual data packet traffic in the network, and compel the ITR, which in the same domain as that the attacker reside in, to discard the packets to be sent to the ETR by actively replying a RLOC corresponding to the EID-prefix as an invalid RLOC, so as to suppress the data packet traffic from the ITR to the ETR, thus the object of the present invention can be achieved. The detection method including:

system initialization processing: the initialization processing on ETR is to, through configuration files, write mapping relationships from EID-prefix to RLOC into the EID-to-RLOC Database and set a threshold of query traffic as the criteria of anomaly; the initialization processing on ITR is to initialize the EID-to-RLOC Caches as Null, set the cache entry expiration time and a ITR local traffic judgment threshold for determining whether the additional Map-Request needs to be transmitted;

the detection flow is as follows:

A. monitoring local traffic and sending Map-Request by an ITR

A1: processing data packet: by the ITR: when receiving data packet from a host, counting and recording the traffic of original data packet currently to be delivered to the EID-prefix in accordance with the prefix of destination EID appeared in the heads of data packet, then querying the EID-to-RLOC Caches; if the corresponding entry exists, turning to step A3; and if not, turning to step A2;

A2: sending a Map-Request: adding a entry of the EID-prefix into the EID-to-RLOC Cache, setting the corresponding RLOC in the entry as invalid, then starting a timer for this cache entry, generating a Map-Request message and sending to ETR, if a Map_Reply is received, turning to step $A_5$, if the timer is expired, performing $A_6$;

A3: determining whether to send an additional Map-Request: determining whether there is any anomaly based on the traffic from the local host to the ETR that is in the destination domain, if it is abnormal, sending an additional Map-Request message to step B2, and turning to step A4, otherwise turning to step A4;

A4: sending the data packet: with respect to the entry in the EID-to-RLOC Cache, determining whether the RLOC in the entry is valid, if it is valid, encapsulating the data packet based on the recorded RLOC and sending it to step B1, otherwise discarding the data packet;

A5: processing the Map_Reply: after receiving the Map_Reply returned from step B4 or B5, updating corresponding entry in the EID-to-RLOC Caches based on EID-prefix information in the Map_Reply A6: processing when the EID-to-RLOC Cache entry is expired: when the entry is expired, deleting the entry of the EID-prefix previously added into the EID-to-RLOC Cache in step A2;

B. Detecting anomaly of the traffic and sending Map_Reply by an ETR

B1: processing data packet: after receiving a data packet sent in step A4, decapsulating the data packet, and forwarding to the end host;

B2: processing Map-Request: after receiving a Map-Request, determining based on the ED-prefix specified by the Map-Request, whether the current query traffic in the whole network with respect to the EID-prefix is abnormal, and if abnormal, turning to step B3, otherwise turning to step B4;

B3: determining whether the query traffic of the ITR currently sending the Map-Request is abnormal: determining whether the query traffic of the ITR, that is sending the Map_Request at this time, is abnormal during the observation period; if the traffic is abnormal, turning to step B5, otherwise, turning to step B4;

B4: replying to ITR of which the query traffic is normal: extracting, based on the EID-prefix specified by the Map-Request, corresponding RLOC information from EID-to-RLOC database and replying to step A5;

B5: replying to ITR of which the query traffic is abnormal: when the query traffic is abnormal, replying the RLOC corresponding to the queried EID-prefix as an invalid RLOC, and feeding back to step A5.

When setting the threshold of query traffic anomaly, the threshold could be set according to the network load. That is, when the network load is at the upper limit of the normal operation, for each ETR, when the total query traffic from all ITRs in the network to the ETR in 50~90% of all the observation periods are not greater than the maximum value N of all the total query traffic, the anomaly threshold of query traffic to the present ETR is set to be equal to or greater than N+1; or taking 60~90% of the upper limit of the processing capability on Map_Request of the ETR which is set in the network (that is to be established) as the threshold. In step $A_3$, it is determined whether there is any anomaly based on the traffic from the local host to a certain EID-prefix, the criteria of anomaly is that: when the network is normally operated, the maximum value of the data traffic from the local hosts to a certain EID-prefix during 50%-90% of all the observation periods is taken as basic number, when the traffic is an integral multiple thereof, the traffic is deemed as abnormal and an additional Map-Request shall be sent. As to the expiration of the timer, the time limit set for the timer can be 3~30 min. In step $B_3$, it is determined whether the query traffic of the ITR is abnormal, and the criteria of the anomaly is that: if the number of Map-Request messages received in the current observation period from the ITR is more than 1, the traffic of the ITR is abnormal.

The invention sufficiently utilizes the characteristic that in the network architecture based on locator/identifier split, in order to implement the mapping of "identifier" and "locator", ITR, ETR and mapping system must be configured and query message shall be sent. The invention detects Network Anomaly based on the traffic of query messages, instead of conventionally using traffic of network data packets so as to effectively reduce the investment on detection device without producing extra overhead of exchanging monitoring information; through the interaction relationship between Map-Request and Map-Reply, the detection system not only supports cross domain coordination, but also has a high reliability and is easy to be maintained; based on the traffic of received Map_Request, the ETR infer whether the traffic of actual data packets is abnormal, and compels the ITR of which the query traffic is abnormal to discard all data messages to the ETR in the next cache period by replying a RLOC corresponding to the EID-prefix as an invalid RLOC, so as to suppress the data packet traffic to some ETR from the ITR. Thus the present invention has advantages of effectively reducing the investment on detection device, the overhead of exchanging monitoring information and the detection system maintenance cost; facilitating cross domain coordination; and efficiently handling the failures occurring during network operation in time; effectively improve the reliability of the network, being propitious to be popularized and applied in a large extent.

DETAILED DESCRIPTION OF THE PREFERRED EMBODIMENTS

Embodiment 1

Figure 1:
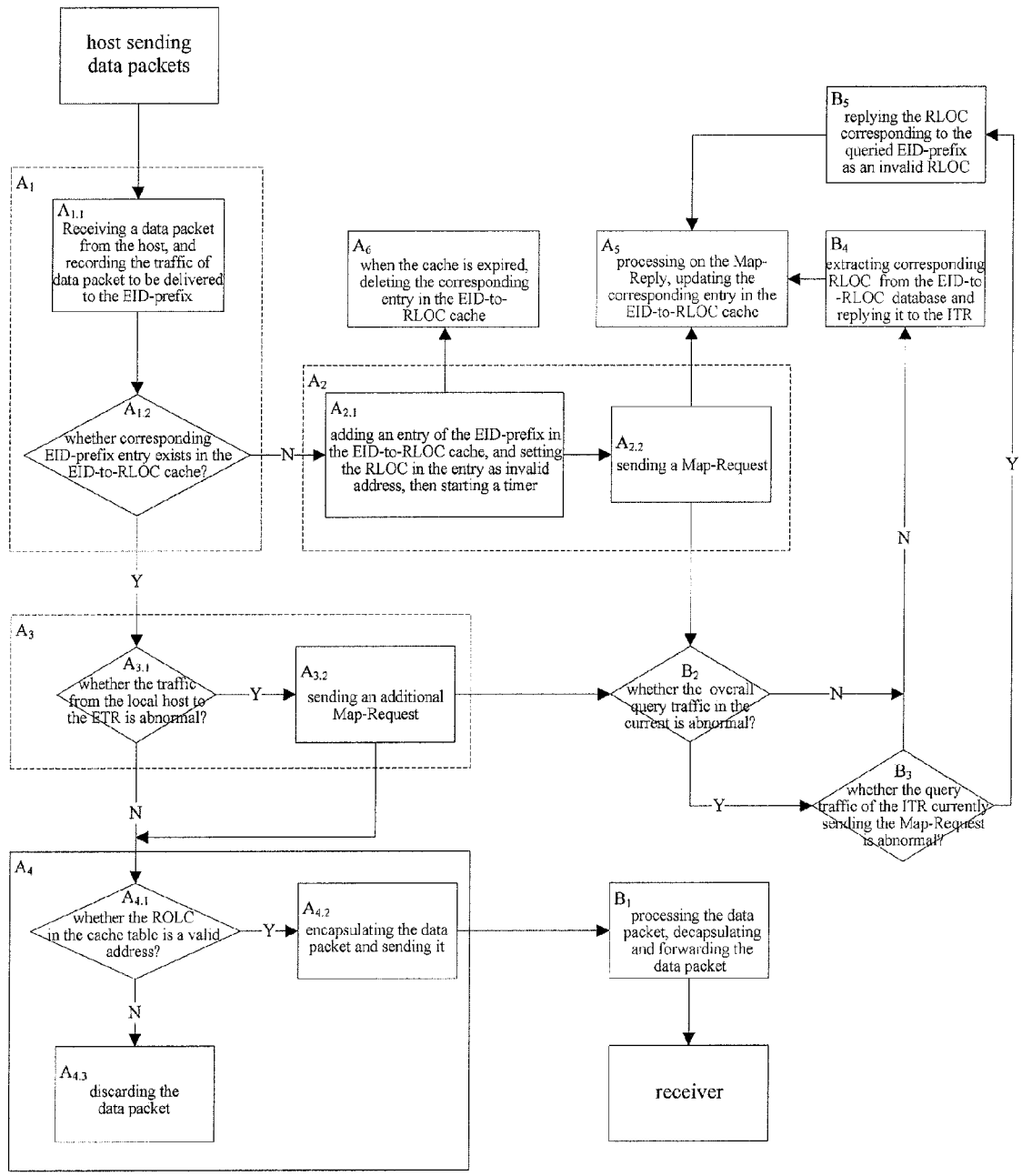
FIG. 1 is a flowchart (block diagram) of a method according to the present invention.

In this embodiment, a network, in which the host locator and identifier are split, with 50 sites is constructed by utilizing the network topology and the information about data traffic between nodes, which are provided by DARPA Intrusion Detection Evaluation (the original IP address of a host is used as EID, the nodes with same prefix is located in a same site and each site is deployed with ITR and ETR at the same time.)

Firstly, the Ingress Tunnel Router and Egress Tunnel Router are initialized respectively: the ETR of each site reads configuration files, writes corresponding mapping relationships from EID-prefixes that it is in charge of to RLOCs into the EID-to-RLOC database, the threshold of traffic anomaly for Map-Request message is set as C=1.2 per minutes (which is determined on the basis of experiments, in the experiments, every 5 minutes is set as an observation period, when the network load is at the upper limit of the normal operation, during the whole process of the experiment, the total query traffic from all the ITRs to the same ETR in 80% of all the observation periods is less than or equal to 5).

The ITR of each site firstly initializes an empty EID-to-RLOC Cache, set the time limit for cache entry as T=5 minutes. On the basis of experiments, the threshold of traffic anomaly for determining whether to send an additional Map-Request is set as $C_L=13$ per minutes (in the experiments, every 5 minutes is set as an observation period, when the network load is at the upper limit of the normal operation, during the whole process of the experiment, the traffic from the local host to a certain EID-prefix in 80% of all the observation periods is less than or equal to 65). This value is taken as a basic number, and when the traffic is an integral multiple thereof, the traffic is determined as abnormal and an additional Map_Request will be sent.

The whole network starts to operate from the time t=0, during the operation, only site 17 is attacked by the hosts of sites 1, 12, 14, 32 during the period of t=8~25 min. Site 1 detects the data packets traffic from the hosts of itself to site 17 goes beyond the predetermined threshold at the t=8 min for the first time, and sends additional Map-Request. Site 12 detects the data packets traffic from the hosts of itself to site 17 goes beyond the predetermined threshold at the t=9 min for the first time, and sends additional Map-Request. Site 14 detects the data packets traffic from the hosts of itself to site 17 goes beyond the predetermined threshold at the t=9 min for the first time, and sends additional Map-Request. Site 32 detects the data packets traffic from the hosts of itself to site 17 goes beyond the predetermined threshold at the t=11 min for the first time, and sends additional Map-Request. Although site 1 sent the additional Map-Request messages at the time of t=8 min, the total query traffic during the current observation period is not greater than 6 for the ETR of site 17. Only at the time of t=9, when the ETR received the additional Map_Request messages from site 14, the Map_Request messages received in the observation period of t=4~9 min in sum is 9 (three Map_Request messages received from site 1, two Map_Request messages received from each of sites 12 and 14, one Map_Request message received from each of site 8 and 11), could the ETR determine that the query traffic is abnormal for the first time and reply a invalid RLOC to the ITR of which the query traffic is abnormal.

During the period of t=0~7 min (the network traffic of each site is normal, the behavior of each ITR is same. Next, the interaction between the ITR of site 1 and ETR of site 17 is explained as an example.)

1. when site 1 receiving data packet sent from local host to site 17 for the first time, is the ITR of site 1 queries the EID-to-RLOC Cache in step $A_1$; as the mapping relationship does not exist, adds a entry of the EID-prefix in the EID-to-RLOC Cache, setting the corresponding RLOC in the entry as invalid, then starts a timer for this entry and sends a Map-Request message at the same time in step $A_2$;

2. after receiving a Map-Request message, ETR of site 17 acquires in step $B_2$ that the number of Map-Requests received in this observation period is less than or equal to 6, and determining that the query traffic is normal; then in step $B_4$, based on the EID-prefix specified by the current Map-Request, extracts its corresponding RLOC information from the EID-to-RLOC Database and feeds Map_Reply back to the ITR of site 1, and so that the ITR can send data to the ETR 3. after receiving the feedback Map_Reply from the ETR, the ITR of site 1 updates corresponding entry in the EID-to-RLOC Cache according to the Map_Reply, in step $A_5$;

4. after receiving the Map_Reply, the ITR of site 1, for the data packet arriving subsequently, queries the EID-to-RLOC cache, the mapping relationship of the EID-prefix exist; and determines in step A3 that the amount of data packet from local to the EID-prefix is normal, therefore an additional Map-Request will not be sent, then encapsulates the data packets and sends to ETR 5. after receiving the data packet, the ETR of site 17 decapsulates the data packets and forwards the data packets to the receiver in step B1;

6. After the local cache is expired, site 1 deletes in step $A_6$ the entry of the EID-prefix previously added to the EID-to-RLOC Cache in step $A_2$;

During the period of t=8~25 min: site 17 is attacked by the hosts in sites 1, 12, 14 and 32. For other sites that did not involving in the attacking, the traffic is normal, therefore the behavior is same as that in the period of t=0~7 min. The behaviors of sites 1, 12, 14 and 32 that involve in the attacking are same. To illustrate, the interaction between ITR of site 14 and ETR of site 17 is explained.

1. The ITR of site 14 receives data packet when the traffic of the data packets of site 14 itself reaches $C_L$ for the first time (at the time of t=9 min). The ITR queries the EID-to-RLOC Cache in step $A_1$, the EID-prefix corresponding to site 17 does not exist, the ITR of site 14 determines the traffic of data packets from this site to site 17 is abnormal and sends additional Map_Request in step $A_3$, then decapsulates the data packets in step $A_4$ (For the reason that, the traffic of site 14 is normal at the time of t=5 min, valid RLOC is replied in respect to the Map_Request sent by site 14.)

2. When receiving the Map_Request message from site 14 (at the time of t=9 min), the ETR of site 17 determines the query traffic is abnormal in step $B_2$ (at the time of t=9 min, the Map_Request messages received in the observation period of t=4~9 min in sum is 9, that is, three Map_Request messages received from site 1, two Map_Request messages received from each of sites 12 and 14, one Map_Request message received from each of site 8 and 11, which is greater than 6), and determines that the number of Map_Request messages sent by the ITR of site 4 in the current observation period is larger than one in step $B_2$, therefore replies in step $B_5$ that RLOC corresponding to the queried EID-prefix is an invalid RLOC;

(For those sites that did not involving in the attacking, the number of Map_Request send by them is equal to one, so the ETR of site 17 will reply a valid RLOC to their Map_Request)

3. after receiving the Map-Reply, for the data packet arriving subsequently to site 17, the ITRs of site 14 queries in step $A_1$ the existence of the entry of the EID-prefix, then turns to steps $A_3$ and then directly discarding the data packet through $A_4$, (because the ETR replies the four sites that the RLOC corresponding to the EID that the four sites want to communicate with as invalid RLOC addresses).

Embodiment 2

Figure 2:
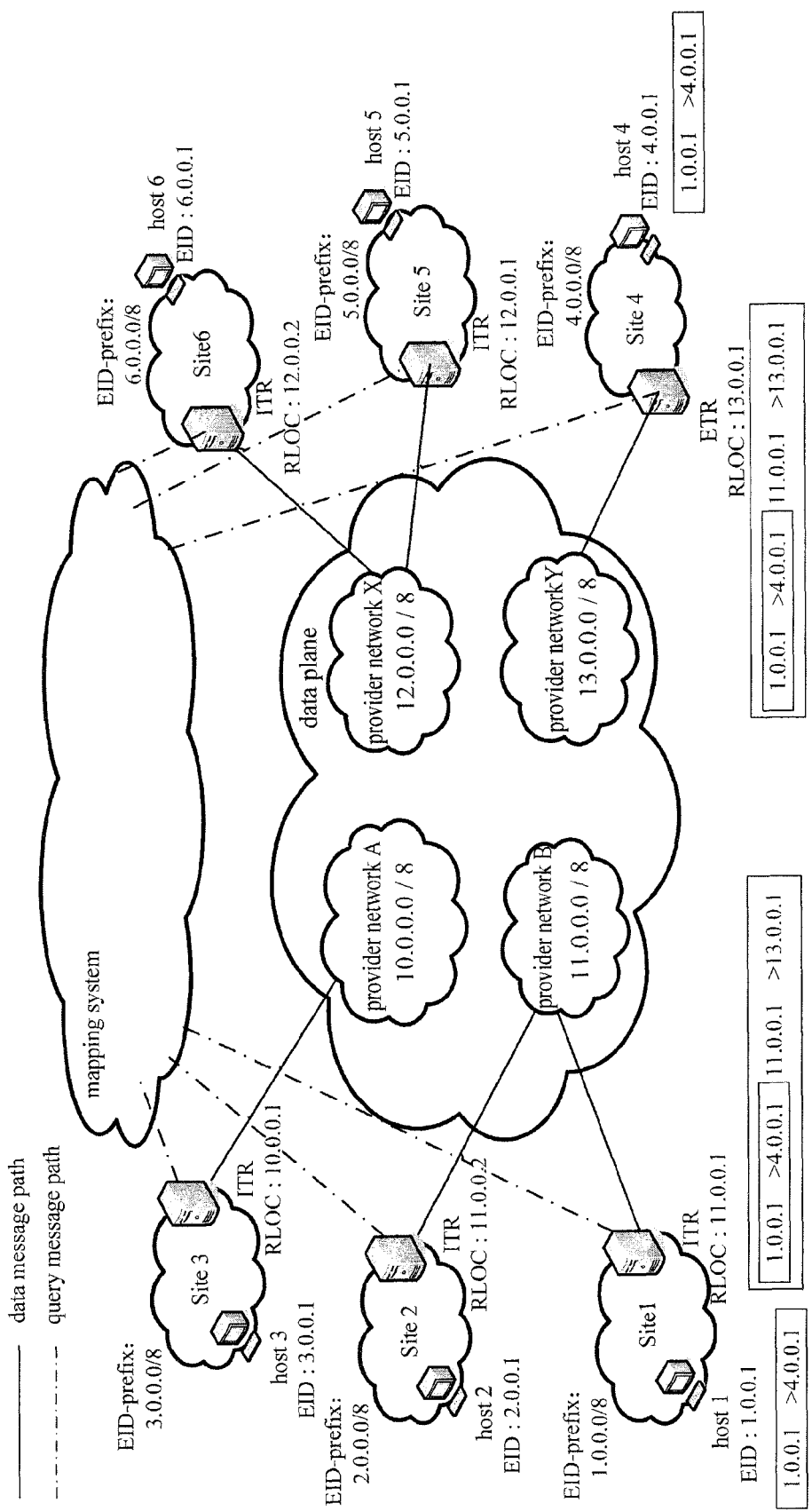
FIG. 2 is a network structural diagram of Embodiment 2.
Figure 3:
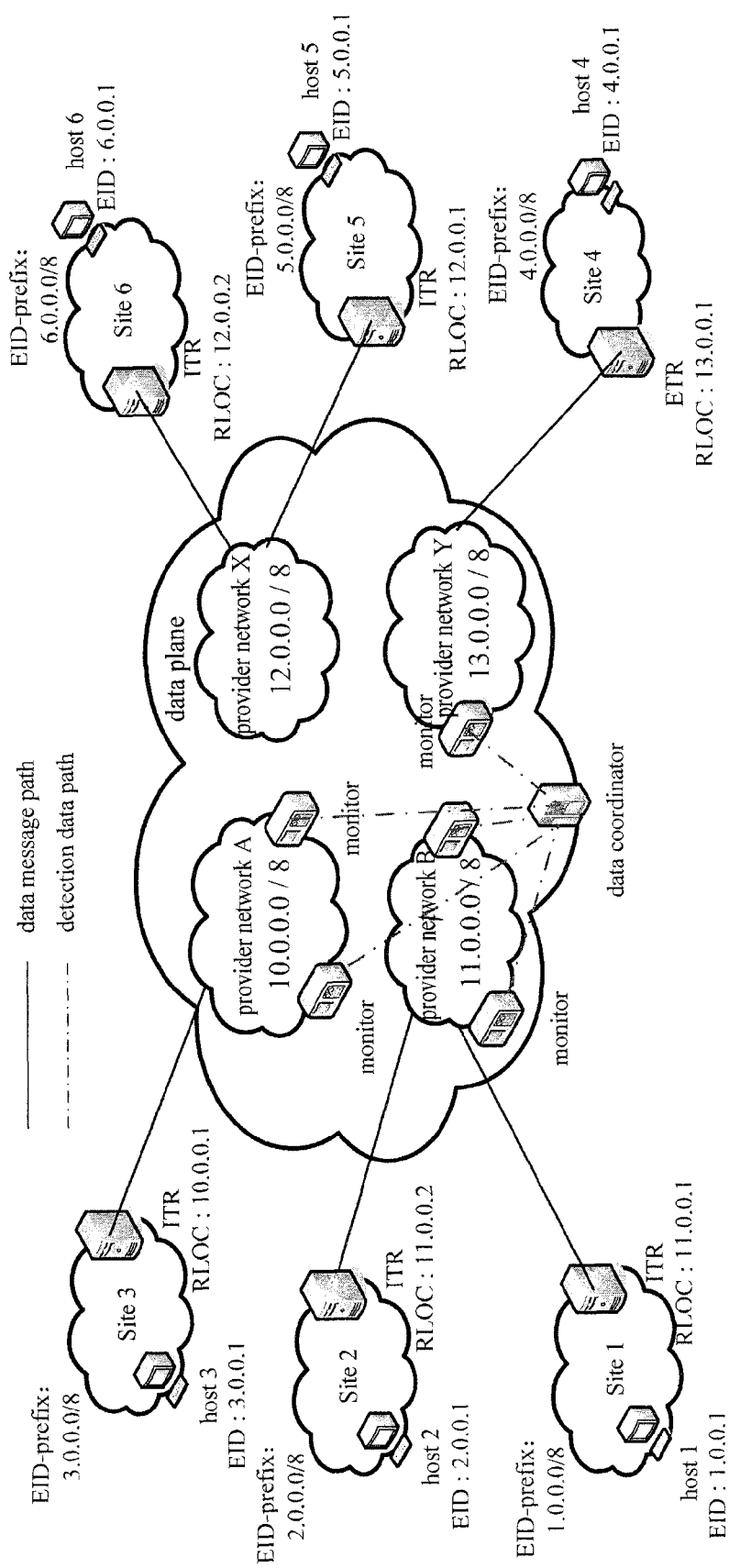
FIG. 3 is a schematic diagram of a conventional distributed Anomaly Detection method in a network architecture based on locator/identifier split.

This embodiment constructs a network with 6 sites, in which the host locator and identifier are split, on the basis of the 1998 DARPA Intrusion Detection Evaluation (http://www.11.mit.edu/mission/communicaitons/ist/corpora/ideval/data/1998data.ht ml) disclosed by MIT Lincoln Laboratory. FIG. 2 is a schematic diagram of a network composition of this embodiment, the configurations of EID-prefix of each site and the RLOC corresponding to the EID-prefix, wherein each site is deployed with TR having ITR and ETR.

Firstly, the ITRs and ETRs are initialized respectively:

the ETR of each site reads the configuration files, writes corresponding mapping relationship from EID-prefix that it is in charge of to RLOC into the EID-to-RLOC database, the threshold of traffic anomaly for Map-Request message is set as C=0.8 per minutes (which is determined on the basis of experiments, in the experiments, every 5 minutes is set as an observation period, when the network load is at the upper limit of the normal operation, during the whole process of the experiment, the total query traffic from all the ITRs to the same ETR in 80% of all the observation periods is less than or equal to 3).

The ITR of each site firstly initializes an empty EID-to-RLOC Cache, set the time limit for cache entry as T=5 minutes. On the basis of experiments, The threshold of traffic anomaly for determining whether to send an additional Map-Request message is set as C=7.2 per minutes (in the experiments, every 5 minutes is set as an observation period, when the network load is at the upper limit of the normal operation, during the whole process of the experiment, the traffic volume from the local host to a certain ETR-prefix in 80% of all the observation periods is less than or equal to 36). This value is taken as a basic number, and when the traffic is an integral multiple thereof, the traffic is determined as abnormal and an additional Map_Request will be sent.

The whole network starts to operate from the time t=0, during the operation, only site 4 is attacked by hosts residing in sites 1 and 5 when t=12~30 min; the timing for sites 1, 2, 3, 5, 6 to send data to site 4 for the first time are respectively at the time of t=1, 2, 5, 11, 15 min; while site 1 and site 5 send additional Map_Requests for the first time at the time of t=12, 13 respectively, and both of them continuously attack until the time of t=30 min. The flows for sites 1, 2, 3, 5, 6 to send data packets to and Map-Requests to site 4 are described as follows A. monitoring local traffic and sending Map-Request by an ITR A1: processing data packet: after receiving a data packet from a local host, the ITR firstly querying the EID-to-RLOC Cache; when a data packet in which the destination EID-prefix is site 4 is firstly received, if the entry for site 4 does not exist, then turning to step A2, otherwise turning to step A3;

$A_2$: sending a Map-Request: after querying through $A_1$ that there is no entry of the EID-prefix in the EID-to-RLOC Cache, adding a entry of the EID-prefix, setting the corresponding RLOC in the entry as invalid (equivalent that the EID-prefix is unreachable), then starting a timer, generating a Map-Request message and sending to ETR, if a Map_Reply is received, turning to step $A_5$, if the timer is expired, performing $A_6$;

$A_3$: determining whether to send an additional Map-Request: observe the traffic of data packets to the destination EID-prefix during the observation period, if the traffic is abnormal, sending an additional Map-Request packet (site 1 and 5 send the additional Map-Request packet at the time of t=12 and 13 respectively); otherwise, no packet is sent, and turning to step $A_4$.

$A_4$: sending the data packets: with respect to the entry in EID-to-RLOC Cache, sites 1 and 5 discard the data packets (achieving the flow control of the data packet) since the RLOC replied by the ETR is invalid, during the period of t=12~30 min; while the RLOC replied by the ETR is valid, thus sites 2, 3, 6 during said period and all ITRs in other periods encapsulate the data packets based, and send to ETR;

$A_5$: processing the Map_Reply: after receiving the Map_Reply returned from ETR, updating corresponding entry in the EID-to-RLOC Cache based on information in the Map_Reply;

$A_6$: processing when EID-to-RLOC Cache expired: when the entry is expired, deleting the entry of the EID-prefix previously added in step A2 into the EID-to-RLOC Cache;

B. Detecting anomaly of the traffic and sending Map_Reply by a ETR $B_1$: processing data packets: after receiving a data packet sent by the ITR, decapsulating the data packets, and forwarding it to its receiver;

$B_2$: processing Map-Request: after receiving a Map-Request, calculating the amount of the requests to the EID-prefix in the observed period based on the EID-prefixes specified by the Map-Requests, and determining whether the amount of the requests is abnormal. If it is abnormal (during the period of t=12~30 min, the amount of requests is abnormal), turning to step $B_3$, Otherwise, turning to step $B_4$.

$B_3$: determining whether the query traffic of the ITR that currently sends the Map-Request is abnormal: during the period of t=12~30 min, with respect to sites 1 and 5, the number of Map-Request message sent during the observation period is more than 1, the query traffic of these ITR is abnormal, and turning to step $B_5$; while the query traffic of other ITRs are normal and turning to step $B_4$;

$B_4$: replying to ITR of which the query traffic is normal: (during the period of t=12~30 min, if the overall traffic of the whole network is determined as abnormal in step $B_2$ and the traffic of ITR which sent the current Map-Requset is determined as normal in step $B_3$, then tuning to this step; at other time, if the overall traffic of the whole network is determined as normal in step $B_2$, also entering this step) extracting, based on the EID-prefix specified by the Map-Request, its corresponding RLOC information from the EID-to-RLOC database and reply it to ITR;

$B_5$: replying to ITR of which the query traffic is abnormal: during the period of t=12~30 min, if the overall traffic of the whole network is determined as abnormal in step $B_2$ and the traffic of the ITR which sent the current Map-Requset is also determined as abnormal in step $B_3$, then replying the RLOC corresponding to the queried EID-prefix as an invalid RLOC, and feeding it back to ITR, so as to limit the traffic of the ITR.

What is claimed is:

1. A method for detecting Network Anomaly in network architecture based on locator/identifier split, wherein the network architecture comprises a plurality of sites, and each of the plurality of sites comprises a plurality of transmitters, a plurality of receiver, an Ingress Tunnel Router (ITR), and an Egress Tunnel Router (ETR), the plurality of transmitter, the plurality of receiver, the ITR, and the ETR which are located within one site having one Endpoint Identity (EID)-prefix, the method comprising:

receiving, by the ITR, a data packet from the transmitter, wherein the data packet comprises the EID-prefix of the receiver which is to receive the data packet;

querying, by the ITR, a corresponding EID-to-Routing Locator (RLOC) in respect to the EID-prefix through an EID-to-RLOC Cache which records mapping relationship of the EID-prefix and RLOC, wherein the EID-to-RLOC Cache is updated by the ITR according to the information indicating the validity of the RLOC which is responded to a Map-Request message by the ETR;

forwarding, by the ITR, the data packet to the receiver via the ETR in response to the obtained information indicating that the corresponding RLOC of the EID-prefix is valid; and discarding, by the ITR, the data packet in response to the obtained information indicating that the corresponding RLOC of the EID-prefix is not valid, wherein the ITR generates the Map-Request message and sends the Map-Request message to the ETR in one of the following cases which comprises that there is no corresponding entry about the EID-prefix in the EID-to-RLOC Cache and that the ITR detects the traffic from the transmitter to the receiver having the EID-prefix being an integral multiple of a predetermined local traffic threshold.

2. The method for detecting Network Anomaly in network architecture based on locator/identifier split according to claim 1, wherein, when the network is not attacked, the maximum value of the data traffic from the local transmitter to the receiver having the EID-prefix in 50%-90% of all the observation periods is taken as the predetermined local traffic threshold.

3. The method for detecting Network Anomaly in network architecture based on locator/identifier split according to claim 1, after querying, by the ITR, a corresponding EID-to-Routing Locator (RLOC) in respect to the EID-prefix, the method further comprising:

adding, by the ITR, an entry of the EID-prefix into the EID-to-RLOC Cache when there is no corresponding entry about the EID-prefix in the EID-to-RLOC Cache, setting the corresponding RLOC in the entry as invalid, and starting a timer;

deleting, by the ITR, the entry of the EID-prefix previously added in to the EID-to-RLOC Cache, when the timer exceeds a predetermined expiration time.

4. The method for detecting Network Anomaly in network architecture based on locator/identifier split according to claim 3, wherein the predetermined expiration time is 3 minutes through 30 minutes.

5. The method for detecting Network Anomaly in network architecture based on locator/identifier split according to claim 1, further comprising:

detecting, by the ETR, the current query traffic in the whole network with respect to the EID-prefix based on the EID-prefix comprised in the Map-Request message;

detecting, by the ETR, the query traffic of each ITR currently sending the Map-Request message in respect to the EID-prefix, when the current query traffic in the whole network with respect to the EID-prefix exceeds a predetermined query traffic threshold;

determining, by the ETR, the ITR which sends the Map-Request message for times exceeding a predetermined number within a current observation period as an abnormal ITR; and sending, by the ETR, the RLOC to the abnormal ITR.

6. A method for detecting Network Anomaly in network architecture based on locator/identifier split, wherein the network architecture comprises a plurality of sites, and each of the plurality of sites comprises a plurality of transmitters, a plurality of receivers, an Ingress Tunnel Router (ITR), and an Egress Tunnel Router (ETR), the plurality of transmitters, the plurality of receivers, the ITR, and the ETR which are located within one site having one Endpoint Identity (EID)-prefix, the method comprising:

receiving, by the ETR, a Map-Request message from the ITR, the Map-Request message comprising the EID-prefix of the receiver which is to receive a data packet from the transmitter via the ITR, the Map-Request message indicating the ETR to query and feed back a corresponding EID-to-Routing Locator (RLOC) in respect to the EID-prefix;

detecting, by the ETR, the current query traffic in the whole network with respect to the EID-prefix based on the EID-prefix;

detecting, by the ETR, the query traffic of each ITR currently sending the Map-Request message in respect to the EID-prefix, when the current query traffic in the whole network with respect to the EID-prefix exceeds a predetermined query traffic threshold;

determining, by the ETR, the ITR which sends the Map-Request message for times exceeding a predetermined number within a current observation period as an abnormal ITR; and sending, by the ETR, information indicating an invalid RLOC to the abnormal ITR to make the ITR discard the corresponding data packet in respect to the invalid RLOC.

7. The method for detecting Network Anomaly in network architecture based on locator/identifier split according to claim 6, further comprising:

extracting, by the ETR, the corresponding RLOC information in respect to the EID-prefix from a EID-to-RLOC database pre-stored in the ETR, and sending the corresponding RLOC information to the ITR, when the current query traffic in the whole network with respect to the EID-prefix does not exceed the predetermined query traffic threshold, or when the current query traffic in the whole network with respect to the EID-prefix exceeds the predetermined query traffic threshold and the query traffic of the ITR which sends the current Map-Request message for times does not exceed the predetermined number within the current observation period as a normal ITR.

8. The method for detecting Network Anomaly in network architecture based on locator/identifier split according to claim 6, further comprising:

setting, by the ETR, the predetermined query traffic threshold as N+1, when the current query traffic in the whole network with respect to the EID-prefix is not greater than the maximum value N of the current query traffic in the whole network.

9. The method for detecting Network Anomaly in network architecture based on locator/identifier split according to claim 6, further comprising:

setting, by the ETR, 60%~90% of the upper limit of the processing capability on Map-Request messages of the ETR configured in the network that is to be established as the predetermined query traffic threshold.

10. The method for detecting Network Anomaly in network architecture based on locator/identifier split according to claim 6, further comprising:

receiving, by the ITR, the data packet from the transmitter, wherein the data packet comprises the EID-prefix of the receiver which is to receive the data packet;

querying, by the ITR, a corresponding EID-to-Routing Locator (RLOC) in respect to the EID-prefix through an EID-to-RLOC Cache which records mapping relationship of the EID-prefix and RLOC, wherein the EID-to-RLOC Cache is updated by the ITR according to the information indicating the validity of the RLOC which is responded to a Map-Request message by the ETR;

forwarding, by the ITR, the data packet to the receiver via the ETR in response to obtained information indicating that the corresponding RLOC of the EID-prefix is valid; and discarding, by the ITR, the data packet in response to obtained information indicating that the corresponding RLOC of the EID-prefix is not valid, wherein the ITR generates the Map-Request message and sends the Map-Request message to the ETR in one of the following cases which comprises that there is no corresponding entry about the EID-prefix in the EID-to-RLOC Cache and that the ITR detects the traffic from the transmitter to the receiver having the EID-prefix being an integral multiple of a predetermined local traffic threshold.

* * * * *